(12) United States Patent
Hagiwara

(10) Patent No.: US 7,295,351 B2
(45) Date of Patent: Nov. 13, 2007

(54) NETWORK MULTIFUNCTION PRINTING SYSTEM

(75) Inventor: Takahiro Hagiwara, Chiba (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 988 days.

(21) Appl. No.: 10/373,656

(22) Filed: Feb. 26, 2003

(65) Prior Publication Data

US 2004/0165212 A1    Aug. 26, 2004

(51) Int. Cl.
*H04N 1/00* (2006.01)
(52) U.S. Cl. ...................................... 358/401; 358/401
(58) Field of Classification Search ................ 358/401, 358/462, 1.15, 1.1; 709/223, 220; 399/24, 399/23; 455/414.1; 379/93.3, 93.2
See application file for complete search history.

(56) References Cited

U.S. PATENT DOCUMENTS

2003/0055888 A1* 3/2003 Matsumoto et al. ........ 709/203
2003/0101236 A1* 5/2003 Ohara ........................ 709/218
2006/0069725 A1* 3/2006 Yokokura ................... 709/203

FOREIGN PATENT DOCUMENTS

JP        2001-243039 A       9/2001

* cited by examiner

*Primary Examiner*—King Y. Poon
*Assistant Examiner*—Saeid Ebrahimi
(74) *Attorney, Agent, or Firm*—Foley & Lardner LLP

(57) ABSTRACT

A control unit configures an MFP system by combining a plurality of functional units connected to an internal network, so that this MFP system includes functions necessary as an MFP. This allows implementation of a desired function by combining a plurality of functional units connected to a network with a high degree of freedom, regardless of whether there is a failure. To inexpensively expand only necessary functions in accordance with the needs, desired functional units can be flexibly combined. When an MFP system to be discarded includes a functional unit whose life has not expired yet, this functional unit can be reused.

20 Claims, 14 Drawing Sheets

QUANTITY IN STOCK/LOWER-LIMIT QUANTITY IN STOCK

| EXPENDABLE MANAGEMENT IP | K TONER | Y TONER | M TONER | C TONER | WASTE TONER BOX | OZONE FILTER |
|---|---|---|---|---|---|---|
| XXX:XX:XX:::X::X1 | 2/2 | 1/0 | 2/1 | 2/1 | 0/0 | 0/0 |
| XXX:XX:XX:::X::X2 | 2/2 | 2/0 | 1/1 | 2/1 | 0/0 | 1/0 |
| XXX:XX:XX:::X::X3 | 3/1 | 3/0 | 3/1 | 1/1 | 1/0 | 0/0 |
| XXX:XX:XX:::X::X4 | 1/2 | 1/0 | 1/0 | 1/0 | 1/0 | 0/0 |
| XXX:XX:XX:::X::X5 | 3/1 | 0/0 | 0/0 | 0/0 | 0/0 | 0/0 |
| TOTAL | 6/3 | 6/2 | 6/2 | 6/2 | 2/3 | 1/1 |

| No | FUNCTION | NECESSARY FUNCTIONAL UNITS |
|---|---|---|
| 01 | COLOR COPIER (40 SHEETS) | IMGC03,CMPC01,SCND01,PRND01,... |
| 02 | COLOR COPIER (20 SHEETS) | IMGC03,CMPC01,SCND01,PRND01,... |
| 03 | COLOR COPIER (20 SHEETS) | IMGC02,CMPC01,SCND01,PRND01,... |
| 04 | COLOR COPIER (10 SHEETS) | IMGC03,CMPC01,SCND01,PRND01,... |
| 05 | COLOR COPIER (10 SHEETS) | IMGC02,CMPC01,SCND01,PRND01,... |
| 06 | MONOCHROME COPIER (80 SHEETS) | IMGM04,CMPM03,SCNM03,PRNM02,... |
| 07 | MONOCHROME COPIER (50 SHEETS) | IMGM04,CMPM05,SCNM03,PRNM03,... |
| 08 | MONOCHROME COPIER (50 SHEETS) | IMGM04,CMPM03,SCNM03,PRNM02,... |
| 09 | MONOCHROME COPIER (10 SHEETS) | IMGM04,CMPM03,SCNM03,PRND01,... |
| 10 | MONOCHROME COPIER (10 SHEETS) | IMGM04,CMPM03,SCND01,PRNM01,... |
| 11 | COLOR PRINTER (10 SHEETS) | IMGC02,CMPC01,RIPC01,PRND01,... |
| 12 | MONOCHROME PRINTER (20 SHEETS) | IMGM04,CMPM03,RIPM01,PRNM02,... |
| : | : | : |

FIG. 8

| No | UNIT No. | FUNCTION | SPEC 1 | SPEC 2 | SPEC 3 | ... | SPEC n |
|---|---|---|---|---|---|---|---|
| 01 | IMGC02 | IMAGE PROCESSING | COLOR | 30 SHEETS/MIN | NUMBER OF SIMULTANEOUSLY OPERABLE UNITS : 2 | | DRIVER Ver 2.11 |
| 02 | IMGM04 | IMAGE PROCESSING | MONOCHROME | 80 SHEETS/MIN | NUMBER OF SIMULTANEOUSLY OPERABLE UNITS : 4 | | DRIVER Ver 2.20 |
| 03 | CMPC01 | DATA COMPRESSION/ EXPANSION | COLOR | 30 SHEETS/MIN | NUMBER OF SIMULTANEOUSLY OPERABLE UNITS : 2 | | DRIVER Ver 2.13 |
| 04 | CMPM03 | DATA COMPRESSION/ EXPANSION | MONOCHROME | 80 SHEETS/MIN | NUMBER OF SIMULTANEOUSLY OPERABLE UNITS : 4 | | DRIVER Ver 2.13 |
| 05 | SCND01 | SCANNER | COLOR/ MONOCHROME | 30 SHEETS/MIN | NUMBER OF SIMULTANEOUSLY OPERABLE UNITS : 2 | | DRIVER Ver 2.11 |
| 06 | SCNM03 | SCANNER | MONOCHROME | 80 SHEETS/MIN | NUMBER OF SIMULTANEOUSLY OPERABLE UNITS : 4 | | DRIVER Ver 2.10 |
| 07 | FAXM01 | FAX TRANSMISSION/ RECEPTION | MONOCHROME | 5 SHEETS/MIN | NUMBER OF SIMULTANEOUSLY OPERABLE UNITS : 1 | | DRIVER Ver 2.11 |
| 08 | PRNM02 | PRINTING | MONOCHROME | 80 SHEETS/MIN | NUMBER OF SIMULTANEOUSLY OPERABLE UNITS : 6 | | DRIVER Ver 2.10 |
| 09 | PRNM02 | PRINTING | MONOCHROME | 80 SHEETS/MIN | NUMBER OF SIMULTANEOUSLY OPERABLE UNITS : 6 | | DRIVER Ver 2.11 |
| 10 | PRND01 | PRINTING | COLOR/ MONOCHROME | 30 SHEETS/MIN | NUMBER OF SIMULTANEOUSLY OPERABLE UNITS : 6 | | DRIVER Ver 2.20 |
| 11 | DPT01 | DISPLAY | COLOR | — | NUMBER OF SIMULTANEOUSLY OPERABLE UNITS : 4 | | DRIVER Ver 2.10 |
| 12 | DPE01 | OPERATION | COLOR/ MONOCHROME | — | NUMBER OF SIMULTANEOUSLY OPERABLE UNITS : 4 | | DRIVER Ver 2.10 |
| 13 | RIPM01 | RIP | MONOCHROME | 20 SHEETS/MIN | NUMBER OF SIMULTANEOUSLY OPERABLE UNITS : 2 | | DRIVER Ver 2.10 |

FIG. 9

| JOBNo | CONFIGURATION INFORMATION | | JOB INFORMATION | | |
|---|---|---|---|---|---|
| | CONFIGURATION No. | JOB ASSIGNMENT | FUNCTION CLASSIFICATION | NUMBER OF ORIGINALS | NUMBER OF COPIES |
| 1 | 1 | FRONT END 440 | COPIER | >50 | 1 |
| 2 | 1 | BACK END 440 | PRINTING | 1 | 1 |
| 3 | 2 | BACK END 540 | PRINTING | 10 | 2 |
| 4 | 2 | BACK END 560 | PRINTING | 3 | 2 |
| 5 | 2 | FRONT END 500 | SCANNER | — | — |
| 6 | 2 | BACK END 540 | PRINTING | 2 | 10 |
| 7 | 2 | BACK END 560 | PRINTING | 3 | 1 |

RECONFIGURE

FIG. 12

NETWORK MULTIFUNCTION PRINTING SYSTEM

BACKGROUND OF THE INVENTION

A multifunction printing system (to be referred to as an MFP system hereinafter) realizes a plurality of functions by connecting various functional units such as a scanner unit, printer unit, image processing unit, paper feed unit, facsimile unit, and finisher unit via a system bus or the like.

Unfortunately, many conventional MFP systems become entirely unusable if any of these functional units fail.

In some conventional MFP systems, a faulty functional unit is disconnected to allow other functional units to be usable. Alternatively, if an error occurs while a printing system is operating, another MFP system connected to the network is searched for, and image data is transferred to the found MFP system to cause the system to perform print job redirecting printing.

This MFP system, however, merely causes another MFP system to perform print job redirecting printing as a temporary countermeasure against a failure, and cannot permanently use functional units of another MFP system regardless of whether there is a failure. In addition, the degree of freedom of combination of functional units is low, and realizable functions are limited in many respects.

Also, it is difficult to inexpensively expand only necessary ones of a plurality of functional units in accordance with the needs. That is, functional units are difficult to flexibly combine.

Furthermore, when the MFP system is to be discarded, the whole system must be discarded at once even if the system still contains a usable functional unit whose life has not expired yet. This makes the system inferior in terms of environmental protection and resource protection.

SUMMARY OF THE INVENTION

The present invention has been made in consideration of the above situation, and has as its object to provide a network MFP system capable of implementing desired functions by combining a plurality of functional units connected to a network with a high degree of freedom, regardless of whether there is a failure.

It is another object of the present invention to provide a network MFP system capable of flexibly combining desired functional units in order to inexpensively expand only necessary functions in accordance with the needs.

It is still another object of the present invention to provide a network MFP system by which a functional unit whose life has not expired yet can be reused when the MFP system is discarded.

A network MFP system of the present invention comprises functional units each having a unique network address and connected to an internal network, and a control unit connected to the functional units across the internal network to control operations of the functional units, wherein the control unit implements a predetermined function by configuring an MFP system by dynamically combining the functional units for each job.

BRIEF DESCRIPTION OF THE DRAWINGS

FIG. 8 is a view for explaining combinations of functional units necessary to implement various functions;

FIG. 9 is a view for explaining the functions and specs of the individual functional units;

FIG. 12 is a view for explaining functions necessary for jobs 1 to 7 and configurations for executing these jobs;

DESCRIPTION OF THE PREFERRED EMBODIMENTS

An embodiment of the present invention will be described in detail below with reference to the accompanying drawings.

Figure 1:
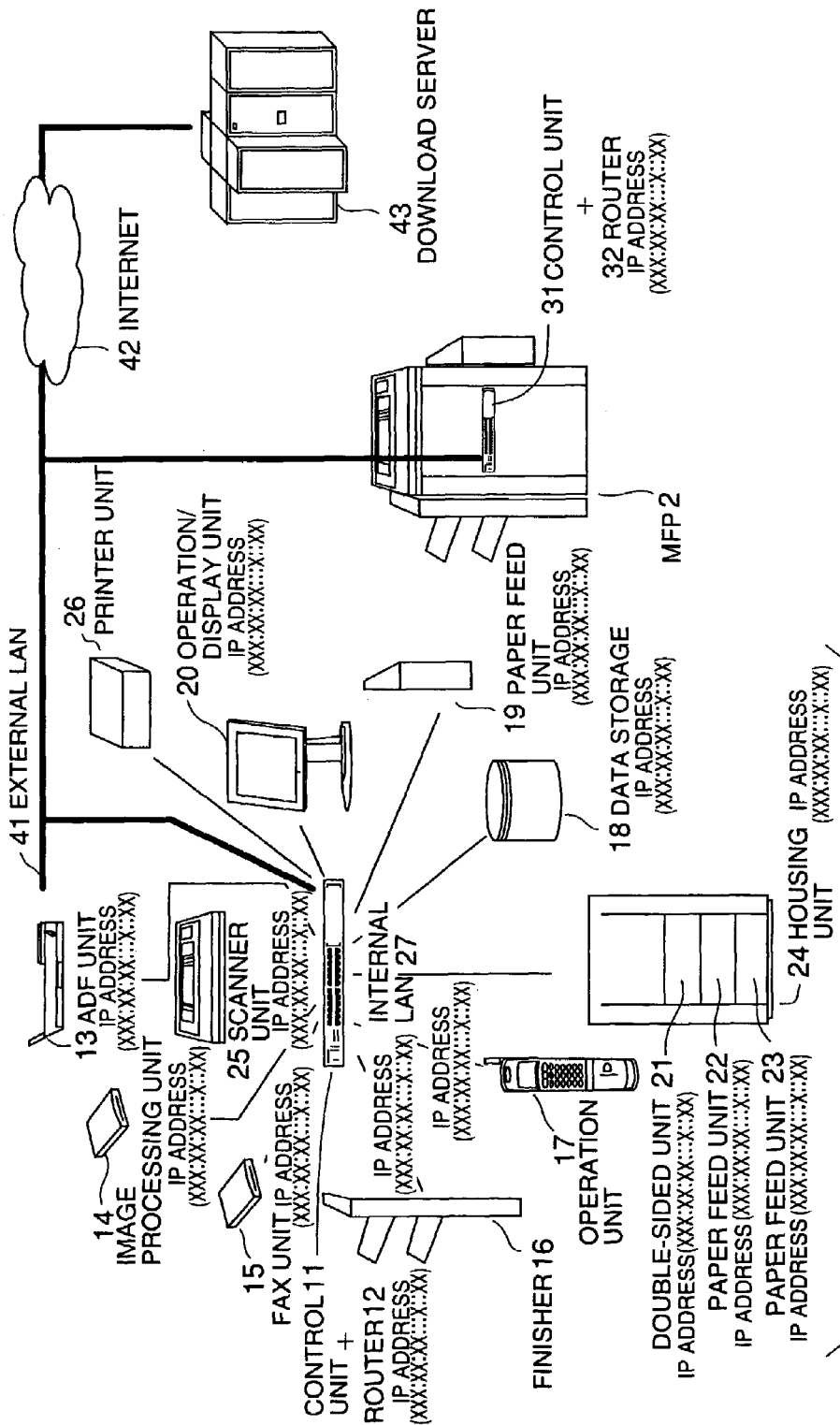
FIG. 1 is a block diagram showing the configuration of a network MFP system according to an embodiment of the present invention.

A network MFP system according to the embodiment of the present invention will be explained below with reference to FIG. 1 showing the configuration of the system.

As functional units for implementing various functions, an MFP 1 comprises an auto discharge and feed (ADF) unit 13 for automatically feeding and discharging originals, a scanner unit 25 for reading originals, an image processing unit 14 for receiving image data, performing predetermined image processing, and outputting the processed data, a FAX unit 15 for receiving image data and transmitting the data to a FAX line, or outputting image data received from the FAX line, a printer unit 26 for receiving and printing out image data, a finisher unit 16 for performing predetermined processing on a printout sheet, an operation unit 17 to be operated by a user, a data storage 18 for storing data, an operation/display unit 20 for displaying various data such as statuses, a double-sided unit 21 for double-sided printing, paper feed units 22, 23, and 19 for storing sheets of predetermined sizes, and a housing unit 24 for housing the whole apparatus.

These functional units are connected to a control unit 11 across an internal LAN (Local Area Network) 27 and controlled by the control unit 11. The control unit 11 is connected to an external LAN 41 via a router 12.

The external LAN 41 is connected to an MFP 2 having a control unit 31 and router 32, and also connected to a download server 43 across the Internet 42. Accordingly, the control unit 11 of the MFP 1 is connected across the external LAN 41 to the control unit 31 via the routers 12 and 32. Functional units (not shown) of the MFP 2 are connected to and controlled by the control unit 31.

The functional units, control unit 11, and router 12 of the MFP 1 have unique network IP addresses. Likewise, the functional units, control unit 31, and router 32 of the MFP 2 have unique IP addresses.

The control unit 11 can exchange data, via the router 12, with the control unit 31 of the MFP 2 connected to the external LAN 41, and can exchange data with the download server 43 across the Internet 42.

Figure 2:
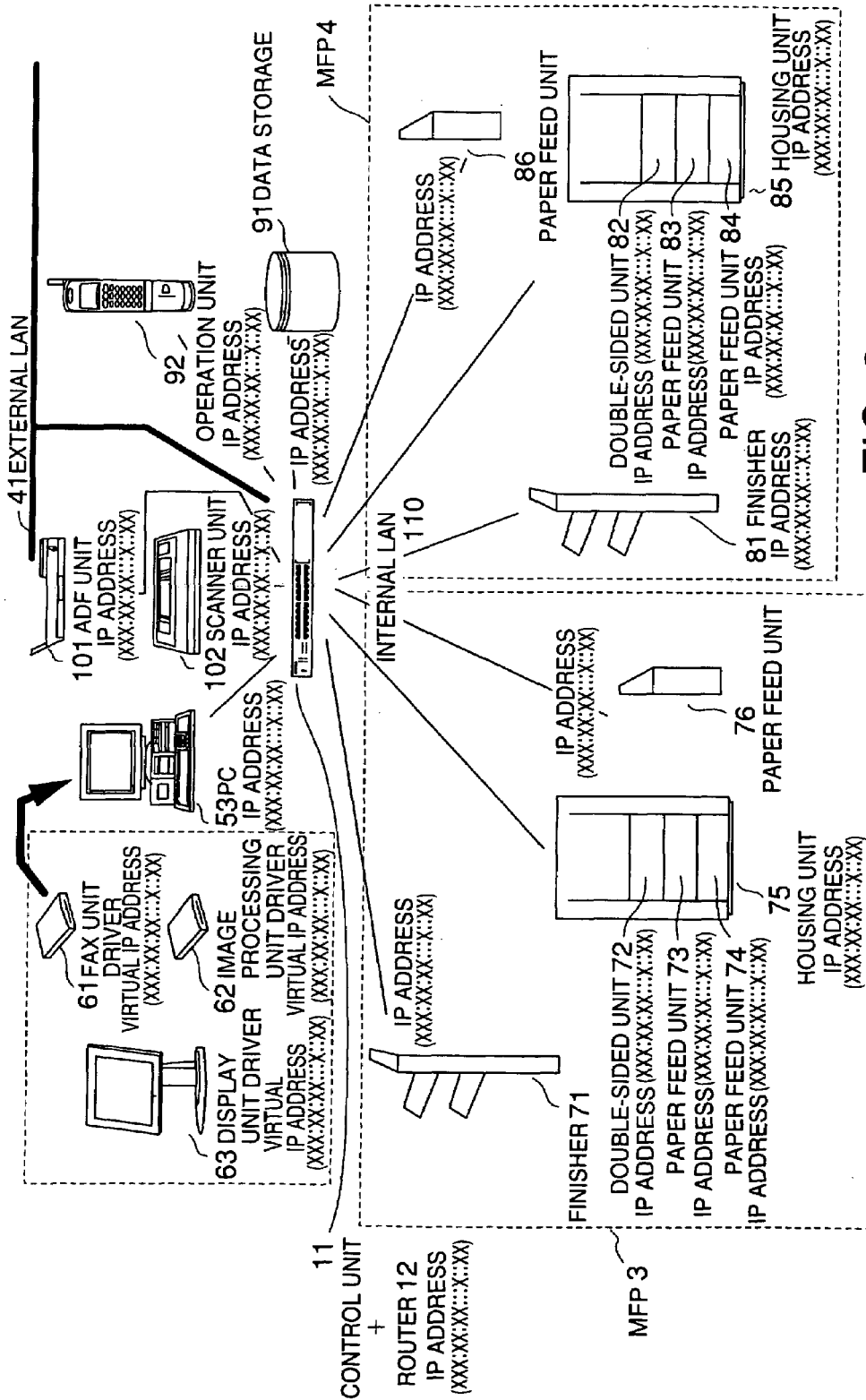
FIG. 2 is a block diagram showing the configuration of the network MFP system when functional units having equivalent functions are added.

With reference to FIG. 2, a configuration when the control unit 11 of the MFP 1 in the above network MFP system forms another MFP by connecting and combining other functional units having equivalent functions via an internal LAN 110 will be explained below. This system is particularly effective when a specific function is to be expanded, e.g., when the processing efficiency is to be increased by operating a plurality of scanner units in parallel. However, if a plurality of functional units having equivalent functions cannot be simultaneously operated, only one functional unit can be operated while the other functional unit is used as an auxiliary unit in the event of a failure.

The control unit 11 of the MFP 1 connects other functional units having equivalent functions via the router 12 and internal LAN 110, in addition to the functional units 13 to 25 described above, thereby forming a new MFP.

The other functional units are a finisher 71, double-sided unit 72, paper feed units 73 and 74, housing unit 75, and paper feed unit 76 of an MFP 3, a finisher 81, double-sided unit 82, paper feed units 83 and 84, housing unit 85, and paper feed unit 86 of an MFP 4, a data storage 91, a remote-control operation unit 92, an ADF unit 101, a scanner unit 102, and a PC 53. In the PC 53, a FAX unit driver 61, image processing unit driver 62, and display unit driver 63 are installed.

These functional units have unique network IP addresses. Similar to the hardware components, the driver software 61 to 63 installed in the PC 53 have virtual IP addresses.

Figure 3:
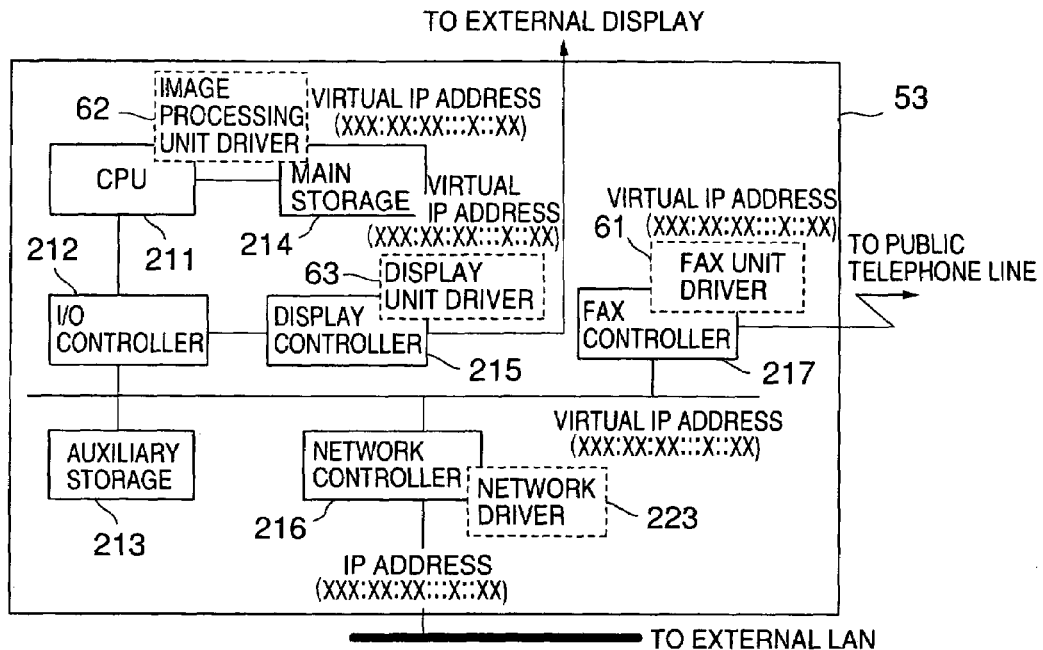
FIG. 3 is a block diagram showing the hardware and software configurations of a personal computer (to be referred to as a PC hereinafter) in the network MFP system.

FIG. 3 shows details of the arrangement of the PC 53.

The control unit 11 shown in FIG. 2 installs various driver software in the PC 53. In addition to the FAX unit driver 61, image processing unit driver 62, display unit driver 63 described above, a network driver 223 is installed.

The PC 53 has hardware components such as a CPU 211, I/O controller 212, auxiliary storage 213, main storage 214, display controller 215, network controller 216, and FAX controller 217. These hardware components have unique network IP addresses. Likewise, the installed driver software 61 to 63 and 223 have virtual IP addresses.

To implement functions of some of the functional units in the MFP 1 instead of these functional units, the control unit 11 installs the driver software 61 to 63 and 223 in the PC 53 and runs the software, thereby implementing desired functions.

Figure 4:
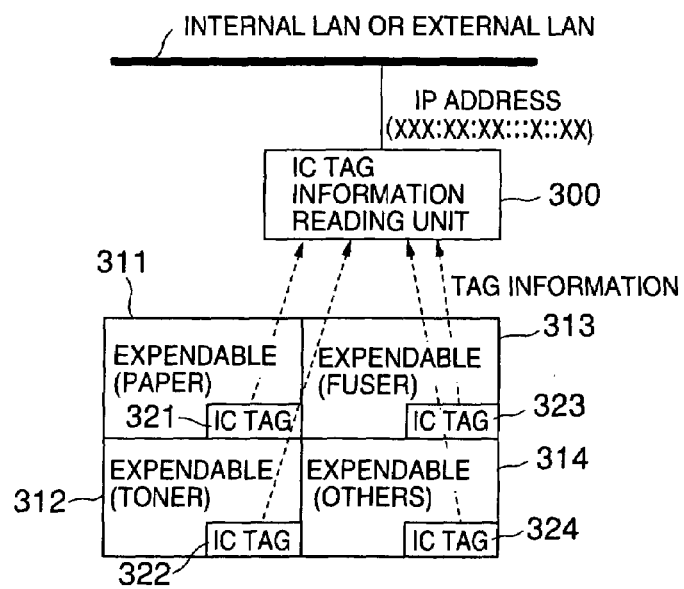
FIG. 4 is a block diagram showing an IC tag information reading unit which can be added to the network MFP system and also showing expendables.

FIG. 4 shows an IC tag information reading unit for managing expendables, which can be further added to the network MFP system according to this embodiment, and also shows the expendables.

The expendables are sheets 311, toner 312, fuser 313, and others 314. IC tags 321 to 324 describing items are attached to these expendables.

Figures 5, 6:
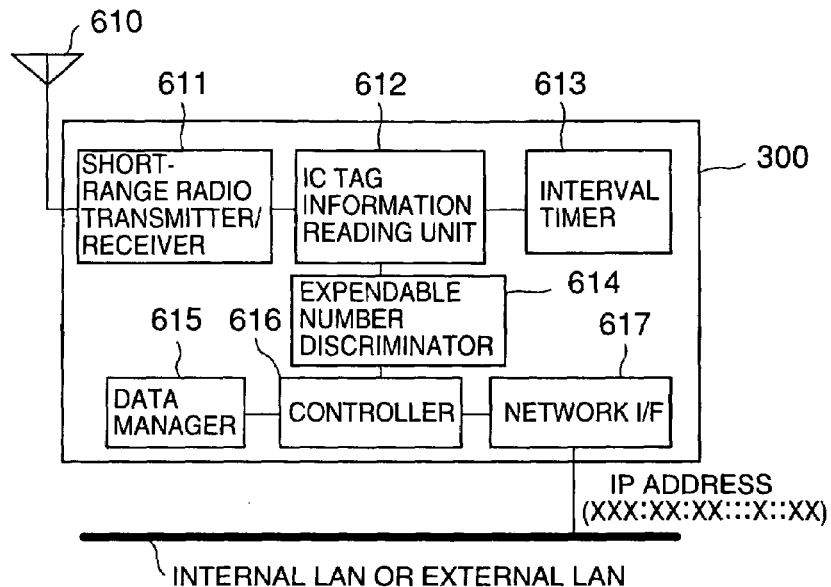
FIG. 5 is a block diagram showing the arrangement of the IC tag information reading unit.
FIG. 6 is a view for explaining the management address and the quantity in stock/the lower-limit quantity in stock of each expendable.

As shown in FIG. 5, the IC tag information reading unit 300 is connected to the internal LAN or external LAN, and includes an antenna 610, short-range radio transmitter/receiver 611, IC tag information reader 612, interval timer 613, expendable number discriminator 614, data manager 615, controller 616, and network I/F 617.

The interval timer 613 measures a predetermined time, and the IC tag information reader 612 reads IC tag information whenever the predetermined time has elapsed. That is, the short-range radio transmitter/receiver 611 inquires of an IC tag by radio via the antenna 610, and receives information returned from the IC tag via the antenna 610. The IC tag information reader 612 reads this IC information, and supplies the information to the expendable number discriminator 614.

The data manager 615 manages a database in which pieces of IC tag information and expendable product numbers are related. The expendable number discriminator 614 uses this database managed by the data manager 615 via the controller 616, and discriminates the product number of an expendable from the read IC tag information, thereby checking the quantity in stock of each product number. The network I/F 617 notifies the control unit 11 of this information across the internal LAN or external LAN.

When the received information is transmitted across the external LAN, the control unit 11 processes this information as stock management information, and forms a stock management list as shown in FIG. 6. The control unit 11 manages each expendable by using a unique management IP address.

For example, for a product number having a management IP address "XXX:XX:XX:::X:X1", the quantity in stock of black (K) toner is 2 with respect to 2 as the lower-limit quantity in stock (quantity necessary for stock), the quantity in stock of yellow (Y) toner is 1 with respect to 0 as the lower-limit quantity in stock, the quantity in stock of magenta (M) toner is 2 with respect to 1 as the lower-limit quantity in stock, the quantity in stock of cyan (C) toner is 2 with respect to 1 as the lower-limit quantity in stock, the quantity in stock of waste toner boxes is 0 with respect to 0 as the lower-limit quantity in stock, and the quantity in stock of ozone filters is 0 with respect to 0 as the lower-limit quantity in stock. In this case, none of these expendables is smaller than the lower-limit quantity in stock.

For a product number having a management IP address "XXX:XX:XX:::X:X3", however, the quantity in stock of black (K) toner is 1 with respect to 2 as the lower-limit quantity in stock. If there is a product number whose quantity in stock is smaller than the lower-limit quantity in stock as described above, the control unit 11 notifies the manager and/or the service center of this information across the external LAN 41.

Also, when received information is transmitted across the internal LAN, the control unit 11 checks whether the expendable is a regular product (a genuine product or an authorized third party product), and describes the result in a part replacement log database concerning expendables. Also, the control unit 11 notifies the manager and/or the service center of the use status.

If the product number of an expendable is not the one of a regular product, the control unit 11 notifies the manager of a warning message indicating that, e.g., a guarantee is limited in the event of a failure. In some instances, the control unit 11 can also control the system so that the system does not operate.

The procedure of processing performed by the network MFP system described above will be explained below with reference to flow charts shown in FIGS. 7A and 7B.

First, a control flow before the MFP system is configured will be described.

Figure 7A:
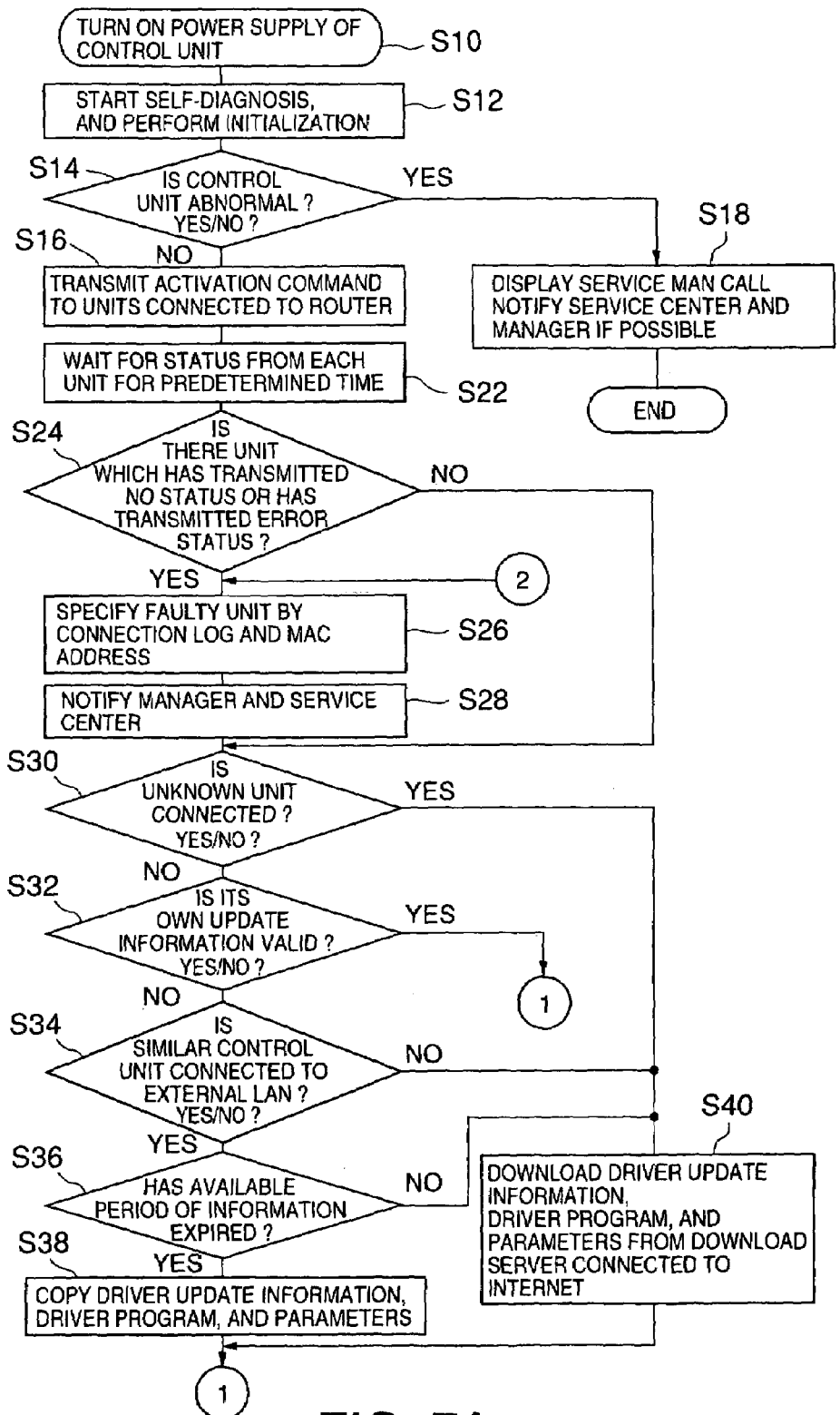
FIGS. 7A and 7B are flow charts showing the procedure of processing performed by the network MFP system.

As shown in FIG. 7A, the power supply of the control unit 11 is turned on in step S10.

In step S11, a self-diagnosis function of the control unit 11 operates to detect a failure of the control unit itself. In addition, necessary initialization is performed.

In step S14, whether the control unit 11 is abnormal is checked. If the control unit 11 is abnormal, the flow advances to step S18 to display a message for calling a person who performs maintenance service on the operation/display unit 20. If possible, the maintenance service center and manager are notified to that effect. This notification is performed by transmitting a message indicating the occurrence of a failure to those computers of the maintenance service center and manager, which are connected to the external LAN 41. In this case, no more processing is possible, so the processing is immediately terminated.

In step S16, the control unit 11 transmits an activation command to the individual functional units connected to the internal LAN via the router 12.

Each functional unit has a so-called wake up function by which the unit is activated by an activation command transmitted from the internal LAN. Accordingly, each functional unit receives a packet sent from the control unit 11, and, if the functional unit determines that the packet is an activation command, a self-diagnosis function starts, and the functional unit transmits the result to the control unit 11.

In step S22, the control unit 11 waits for a predetermined time after transmitting the activation command to the functional units and before receiving self-diagnostic results from these functional units.

In step S24, the control unit 11 checks whether there is a functional unit which has not returned a self-diagnostic result even after the predetermined time has elapsed or which has returned an error status.

If such a functional unit exists, the control unit 11 specifies this faulty functional unit in step S26. If a functional unit has returned an error status, this functional unit can be readily specified. However, a functional unit which has not returned a diagnostic result cannot be directly specified. Therefore, the control unit 11 specifies the faulty functional unit by combining, e.g., past connection log information and physical MAC address information attached to each hardware added to the LAN I/F.

In step S28, the control unit 11 notifies the system manager and the manufacturer's service center of information of the faulty functional unit, and the flow advances to step S30. In this case, the control unit 11 removes the faulty functional unit from the combinable configuration list, and forms an MFP system by using other functional units.

If the control unit 11 determines in step S24 that there is no functional unit which has not returned a self-diagnostic result even after the elapse of the predetermined time or which has returned an error status, the flow advances to step S30.

In step S30, the control unit 11 checks whether an unknown functional unit is connected across the internal LAN to the control unit 11 via the router 12. If an unknown functional unit is connected, the flow advances to step S40. In step S40, the control unit 11 accesses the download server 43 connected to the Internet 42 to specify the unknown functional unit on the basis of information such as an MAC address or the like, thereby checking whether this functional unit can be added to the configuration. If this unknown functional unit can be added to the configuration, the control unit 11 downloads a driver program, parameters, and the like which the control unit 11 requires to operate the unit, thereby performing update. After that, the flow advances to step S50 in FIG. 7B.

If no unknown functional unit is connected to the internal LAN in step S30, the flow advances to step S32, and the control unit 11 checks whether its own driver and parameters are updated. If these driver and parameters are updated and valid, the flow advances to step S50.

If the driver and parameters are invalid, the flow advances to step S34 to check whether a similar control unit is connected to the external LAN 41. If no such control unit is connected, the flow advances to step S40, and the control unit 11 downloads driver update information, a driver program, and parameters from the download server 43 connected to the Internet 42.

If it is determined in step S34 that a similar control unit is connected to the external LAN 41, the control unit 11 checks in step S36 whether the driver and parameters of the control unit are information whose available period has expired. If the available period has expired, the flow advances to step S40. If the available period has not been expired, the flow advances to step S38, and the control unit 11 copies the driver update information, driver program, and parameters of the control unit.

The control unit 11 must refer to such update information whenever the available period of its own driver and parameters has expired or the configuration of functional units has changed as will be described later.

Figure 7B:
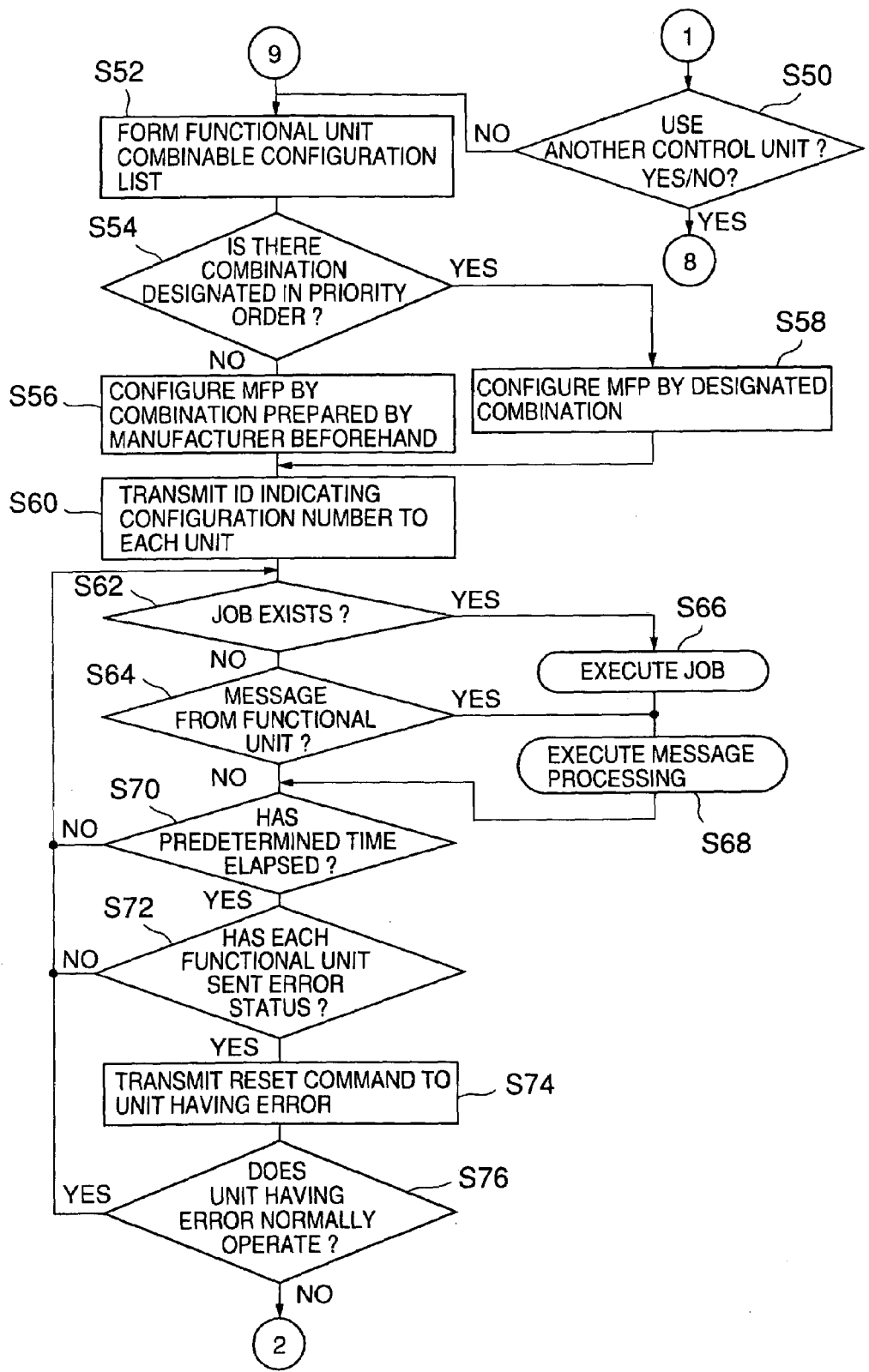

The flow then advances to FIG. 7B. After the driver and parameters are updated to the latest ones through the above processing, a configuration which can be implemented by using functional units which are connected across the internal LAN 110 to the control unit 11 via the router 12 and which normally operate is determined.

If the priority order of combinations is designated as will be described later, an MFP is formed by using this priority order. For example, from a combinable configuration list provided by the manufacture beforehand as shown in FIG. 8, the manager sometimes sets the priority order in advance when the MFP is installed. In a case like this, a configuration is determined by selecting functional units on the basis of this designated priority order.

If no such designated priority order of combinations is present, a combinable configuration list provided by the manufacturer beforehand is used.

For example, as shown in FIG. 8, a functional unit combination necessary to realize a color copier (40 sheets) as function number 01 includes an image processing unit IMG03, data compression/expansion unit CMP01, scanner unit SCND01, printing unit PRND01, and the like.

Also, the control unit 11 has a management table concerning the type of function, processing performance, and driver software of each functional unit as shown in FIG. 9. For example, an image processing unit (IP address; IMGCO2) has an image processing function, color image processing capability as spec 1, and processing capability of 30 sheets/min as spec 2. In addition, two such image processing units can be simultaneously operated as spec 3, and the unit is operated by a driver of version 2.11 as spec n (n is a positive number of 1 or more).

As shown in step S50, functional units may also be added to an external configuration as needed. The control unit 11 checks whether to add to the configuration an external functional unit connected to the other control unit 31 which is connected to the control unit 11 across the external LAN 41. If YES in step S50, the flow advances to FIG. 10. If NO in step S50, the flow advances to step S52.

Figure 10:
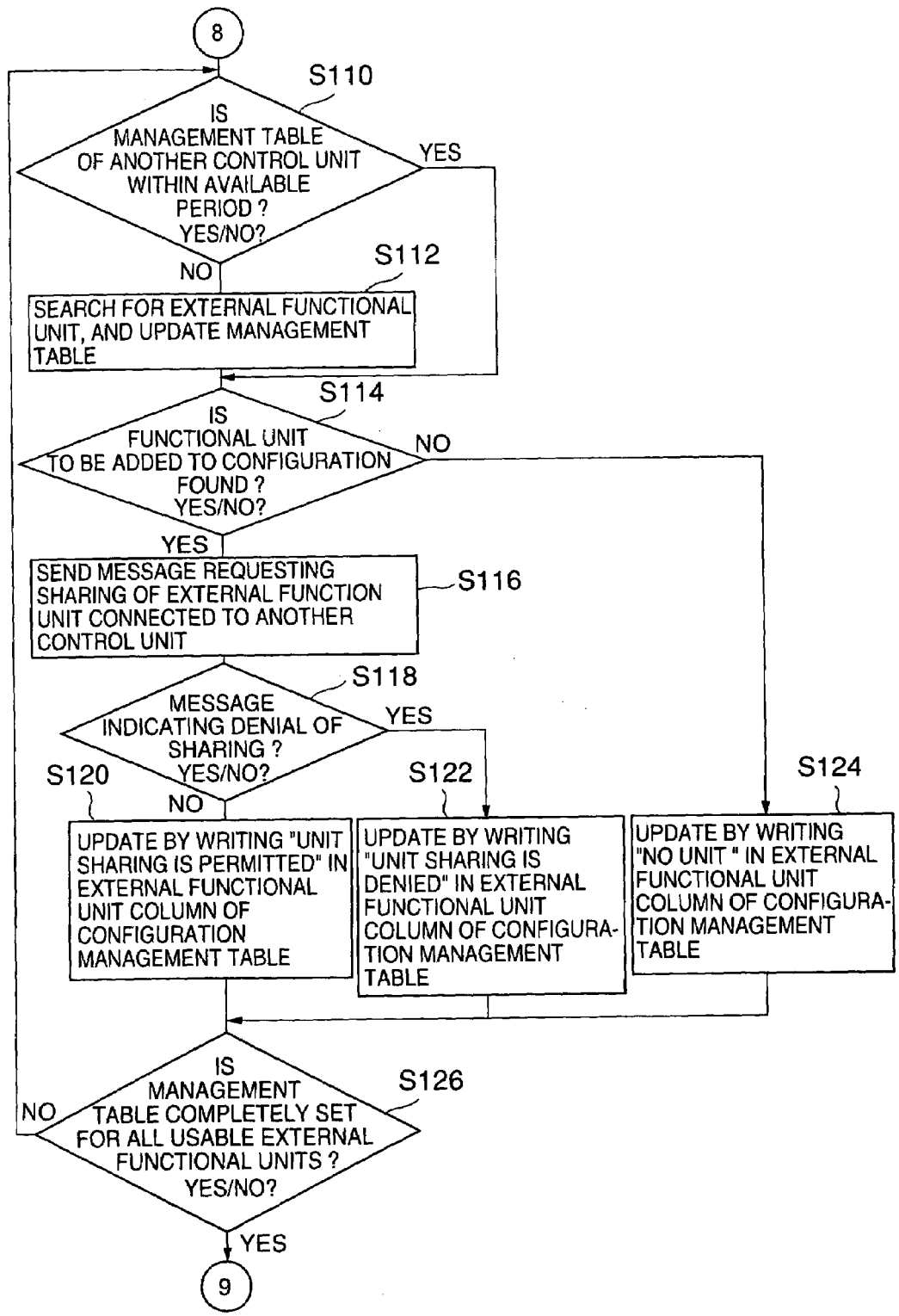
FIG. 10 is a flow chart showing the procedure of adding a functional unit connected to an external LAN to the network MFP system.

If the external functional unit is to be added to the configuration, the flow advances to step S110 in FIG. 10, and the control unit 11 checks whether the management table of the other control unit 31 is within the available period.

If the management table is not within the available period, the flow advances to step S112, and the control unit 11 searches for the external functional unit to update the management table.

If the management table is within the available period or after step S112 is complete, the flow advances to step S114 to check whether the predetermined functional unit to be added to the configuration is found. If the functional unit is found, the flow advances to step S116; if not, the flow advances to step S124.

In step S116, the control unit 11 sends to the other control unit 31 a message requesting sharing of the external functional unit connected to the control unit 31.

In step S118, the control unit 11 checks whether the other control unit 31 returns a message indicating denial of sharing to the control unit 11.

If no sharing denial message is returned, the flow advances to step S120, and the control unit 11 writes information "unit sharing is permitted" in an external functional unit column of the configuration management table, and updates the version of the table.

If functional units connected to the external control unit 31 include a functional unit having a function equivalent to that of a functional unit connected to the internal LAN, the control unit 11 preferentially adds this functional unit connected to the internal LAN to the MFP system configuration. This further improves the operation stability.

On the other hand, if a sharing denial message is returned, the flow advances to step S122, and the control unit 11 writes information "unit sharing is denied" in the external functional unit column of the configuration management table, and updates the version of the table.

If in step S114 no functional unit to be added to the configuration is found, the flow advances to step S124, and the control unit 11 writes information "no unit" in the external functional unit column of the configuration management table, and updates the version of the table.

After steps S120, S122, and S124 are complete, the flow advances to step S126 to check whether the configuration management table setting process is completely performed for all usable external functional units. If NO in step S126, the flow returns to step S110. If YES in step S126, the flow returns to step S52.

If no external functional unit connected to the other control unit 31 is to be added to the configuration, in step S52, a configuration list necessary to implement a desired function is formed by combining functional units connected to the control unit 11 across the internal LAN 110.

In this case, some functional units are so set as to be sharable. For example, even if the MFP 1 shown in FIG. 1 has no FAX unit, FAX data can be directly transmitted from the MFP 1 by adding the FAX unit of the MFP 2 to the configuration.

However, a large number of network apparatuses are connected to the external LAN 41 and shared. This makes it difficult to ensure performance when data is transferred across the external LAN 41. Therefore, the control unit 11 monitors whether predetermined performance is obtained for data transferred to a functional unit connected across the external LAN 41. If no predetermined performance is obtained, the control unit 11 notifies the manager or the like of a warning message.

Even while the system is in operation after the configuration is determined, the control unit 11 monitors whether each functional unit is normally operating. Each functional unit executes self-diagnosis for each predetermined time, even while the unit is not in operation and standing by, and notifies the control unit 11 of the result.

If this notification sent from a functional unit to the control unit 11 is an error status or if no notification is sent to the control unit 11 for a predetermined time, the control unit 11 sends a reset command to the corresponding functional unit to check whether the functional unit normally operates. If this functional unit does not normally operate after resetting, the control unit 11 reconfigures the MFP by combining other functional units except this functional unit. The control unit 11 similarly reconfigures the MFP when deleting an operating functional unit from the internal LAN.

The procedure of reconfiguration is the same as the flow of determining a configuration after the power supply is turned on. When reconfiguration is thus performed, the operation unit 17 is notified of this information so that the user notices that the configuration is changed. The contents can also be displayed on the operation/display unit 20 to allow the user to know the details of the reconfiguration.

Reconfiguration is also performed when a new functional unit is added across the internal LAN 110 to the control unit 11 via the router 12 while the system is in operation.

This addition of a functional unit can be performed while the operation continues without turning off the power supply of the whole system.

When a new functional unit is added, the number of configurable combinations increases. If the newly added combination has priority over the existing combinations, the priority order is automatically changed.

If the control unit 11 cannot automatically change this priority order, the control unit 11 displays or notifies the manager of a message to perform resetting.

For example, if no functional unit analogous to a new functional unit exists in the existing combinations, this new functional unit is simply added. If a functional unit similar to a new functional unit exists and these two units can be simultaneously operated in combination, the new functional unit is added to the configuration to improve the performance. If the two functional units cannot be operated at the same time, the new functional unit is used as an auxiliary unit.

In step S54 of FIG. 7B, whether there is a combination whose priority order is designated by the manager or the like is checked. If such a combination is present as described previously, the flow advances to step S58 to configure an MFP by the designated combination. If no such combination is present, the flow advances to step S56 to configure an MFP by using a combination prepared by the manufacturer.

In step S60, an ID address indicating a configuration number is transmitted to each functional unit used in the configuration.

In step S62, whether a job exists is checked. If a job exists, this job is executed in step S66. This job execution will be described later with reference to FIG. 11A.

If no job exists, this is equivalent to a standby state in which the system does not operate as an MFP. In this standby state, the processing from step S62 to step S76 is repeated.

In step S64, whether a message is sent from a functional unit to the control unit 11 is checked. If there is a message, the message is processed in step S68. This message processing will be explained later with reference to FIG. 11C.

In step S70, the control unit 11 checks whether a predetermined time has elapsed. If NO in step S70, the flow returns to step S62. If YES in step S70, the flow advances to step S72, and the control unit 11 checks whether each functional unit has an error status, non-updated status, or the like. If no such status is present, the flow returns to step S62. If such a status is present, the flow advances to step S74, and the control unit 11 transmits a reset command to the functional unit which has sent this error status.

In step S76, the control unit 11 checks whether the functional unit which has transmitted an error status has restored its normal operation by resetting. If the normal operation has not been restored, the flow advances to step S26 described above. If the normal operation has been restored, the flow advances to step S62 to continue the standby state.

As described above, if a failure occurs in an incorporated functional unit after the MFP system is configured, the control unit 11 gives a reset command to the faulty functional unit to check whether the functional unit normally operates. If the control unit 11 determines that there is an error, the flow returns to step S26 to reconfigure the MFP system by using other functional units except for the faulty functional unit.

The job execution procedure will be described below with reference to FIGS. 11A to 1C. In this embodiment, the MFP configuration can be dynamically changed so as to minimize the time required to complete each job.

Figure 11A:
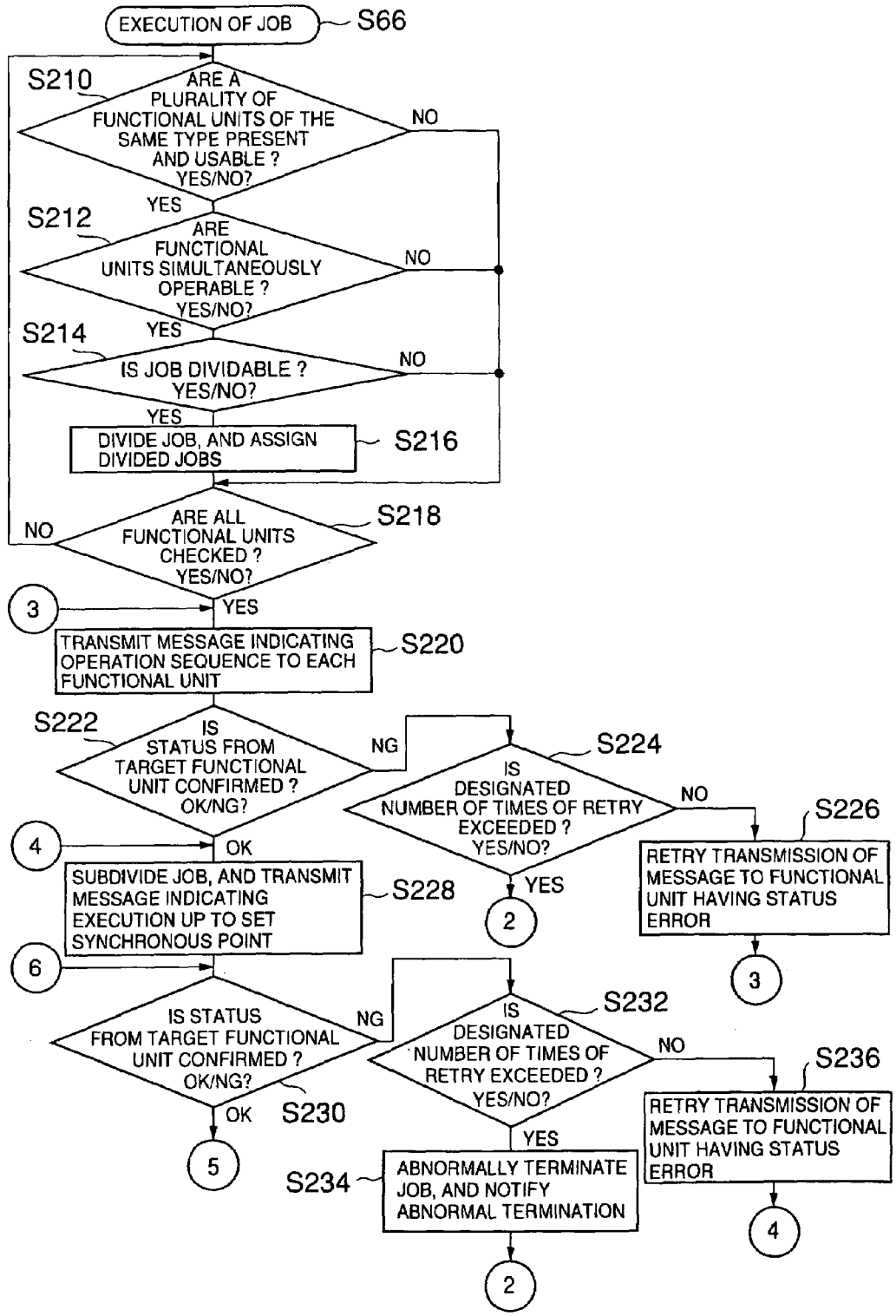
FIGS. 11A, 11B, and 11C are flow charts showing the procedure of processing performed by the network MFP system.

As shown in FIG. 11A, in step S210, whether a plurality of functional units having equivalent functions are present and usable is checked. If no plurality of usable functional units are present, the flow advances to step S218. If a plurality of usable functional units are present, the flow advances to step S212.

In step S212, whether these functional units can be simultaneously operated is checked. If they cannot be operated at the same time, setting is so performed that one functional unit is used and the remaining functional units are used as backup in the event of a failure, and the flow advances to step S218. If these functional units can be simultaneously operated, the flow advances to step S216.

In step S216, a job is divisionally assigned to these functional units.

In step S218, whether each functional unit normally operates is checked before the job is executed. If the functional unit does not normally operate, the flow returns to step S210. If the functional unit normally operates, the flow advances to step S220, and the functional unit executes the assigned job.

If a functional unit connected to an external network is added to the MFP system configuration, the control unit 11 monitors whether this functional unit satisfies predetermined performance. If it is determined that the functional unit does not satisfy the performance, the control unit 11 may output a warning message to the operation/display unit 20.

On the basis of the contents of individual jobs (Nos. 1, 2, 3, . . . ), e.g., information such as the function classification, the number of originals to be processed, and the number of copies, combinations of functional units necessary to implement the functions shown in FIG. 8 are referred to, and an optimum combination, i.e., a combination by which the job completion time is minimized is determined for each job.

FIG. 12 shows combinations of functional units configured to execute job Nos. 1 to 7.

Job Nos. 1 and 2 are executed by the functional unit combination of configuration No. 1.

Figure 13:
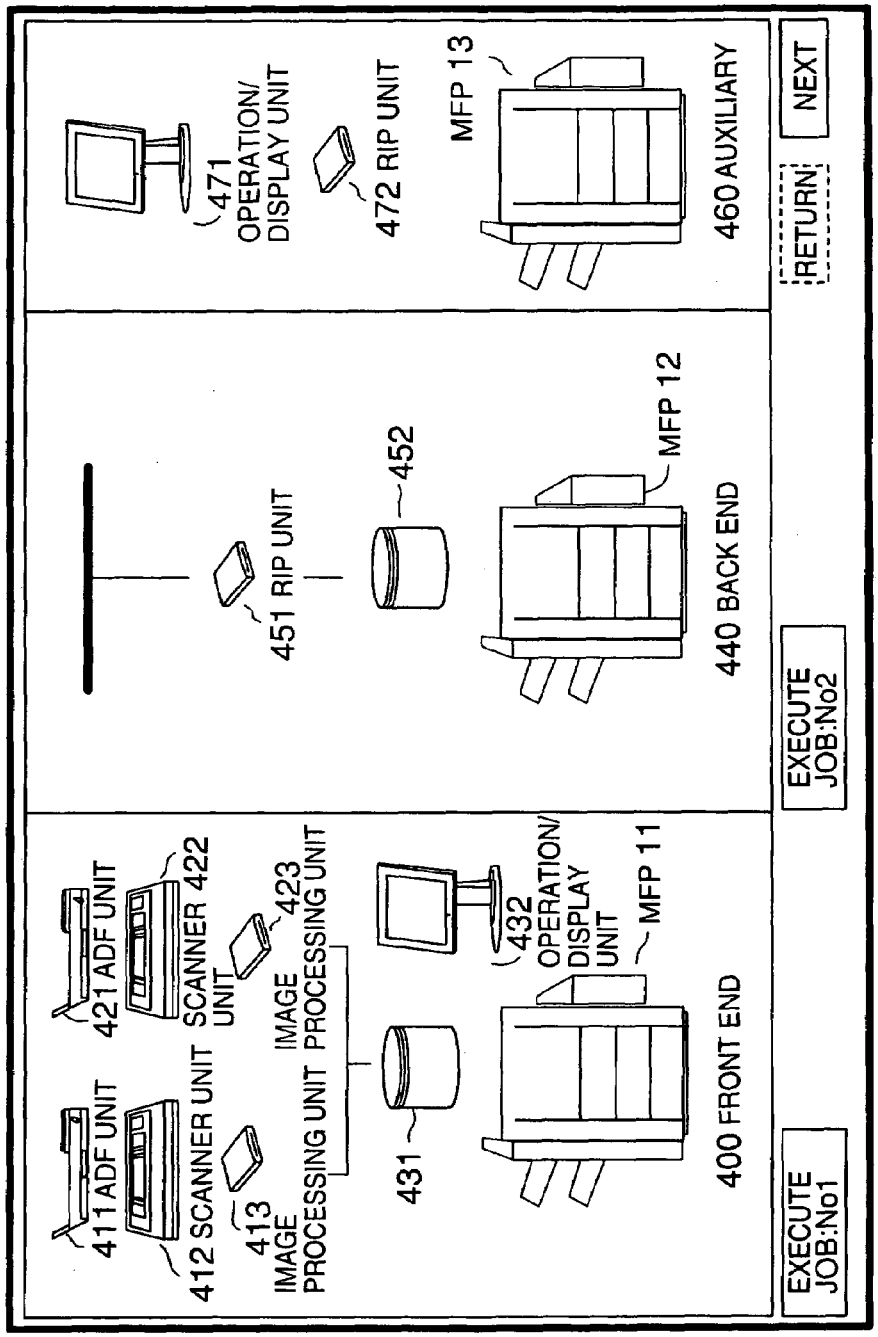
FIG. 13 is a block diagram showing combinations of functional units configured to execute jobs 1 and 2.

FIG. 13 shows functional units combined as configuration No. 1. That is, FIG. 13 shows a configuration which presents to the user an image on the display screen of the operation/display unit 20.

As a front end 400 in front of the user, an MFP 11, ADF units 411 and 421, scanner units 412 and 422, image processing units 413 and 423, data storage 431, and operation/display unit 432 are combined.

As a back end 440 not directly seen by the user, an MFP 12, RIP (Raster Image Processor) unit 451, and data storage 452 are combined.

To prepare for a failure, an MFP 13, operation/display unit 471, and RIP unit 472 exist as an auxiliary 460.

The function classification of job No. 1 is a copier. The number of originals is 50 or more, and the number of copies is 1. Job No. 1 is executed by using the front end 410 of configuration No. 1 shown in FIG. 13.

The function classification of job No. 2 is printing. The number of originals is 1, and the number of copies is also 1. Job No. 2 is executed by using the back end 440 of configuration No. 1 shown in FIG. 13. With these combinations, the completion times of job Nos. 1 and 2 can be minimized.

Figure 14:
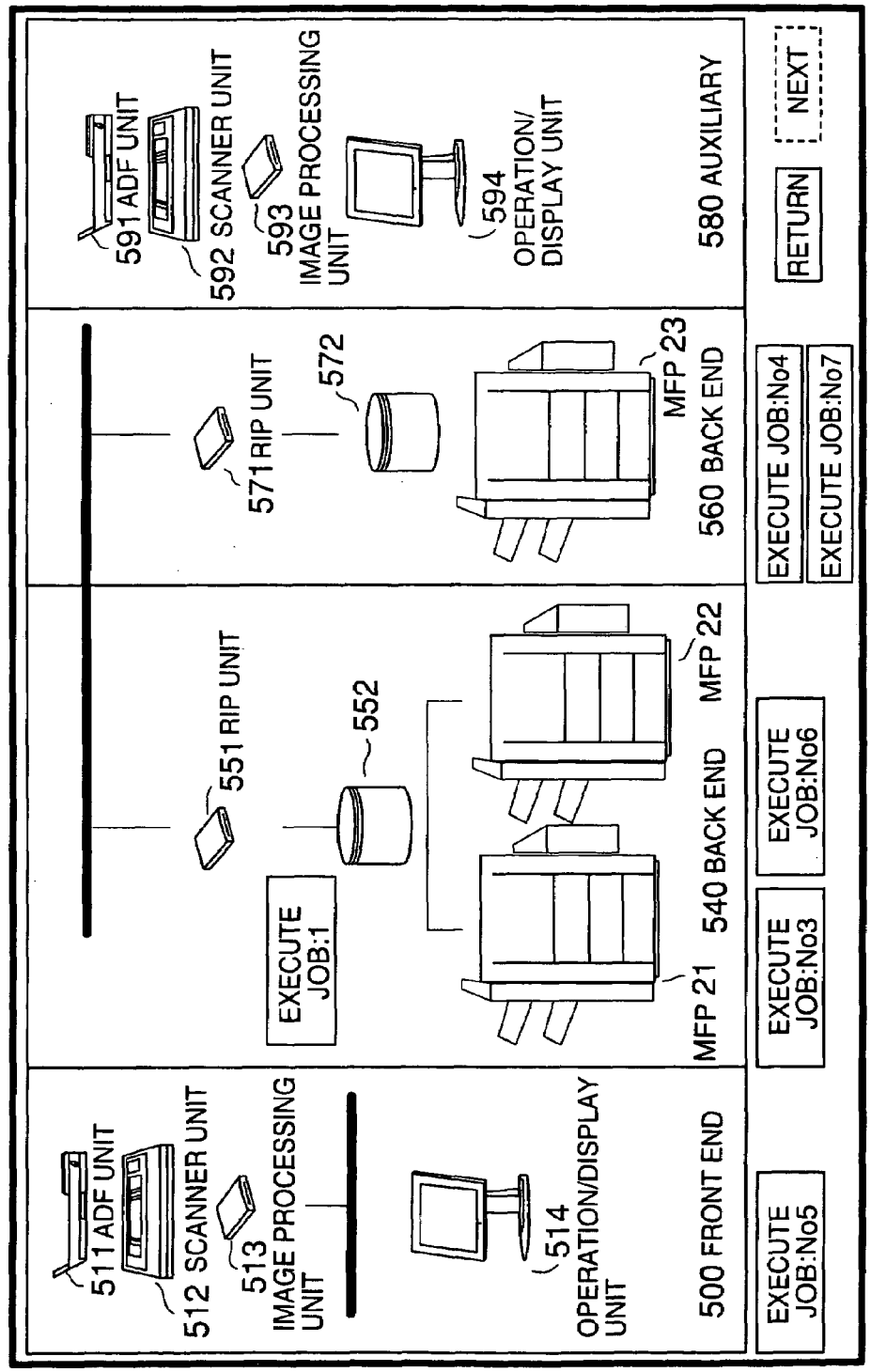
FIG. 14 is a block diagram showing combinations of functional units configured to execute jobs 3 to 7.

As shown in FIG. 12, the functional unit combination must be reconfigured when the operation proceeds from job No. 2 to job No. 3. FIG. 14 shows a functional unit combination as configuration No. 2. Similar to FIG. 13, FIG. 14 shows a configuration which presents to the user an image on the display screen of the operation/display unit 20.

As a front end 500, an ADF unit 511, scanner unit 512, image processing unit 513, and operation/display unit 514 are combined.

As a back end 540, MFPs 21 and 22, RIP unit 551, and data storage 552 are combined.

As a back end 560, an MFP 23, RIP unit 571, and data storage 572 are combined.

As an auxiliary 580, an ADF unit 591, scanner unit 592, image processing unit 593, and operation/display unit 594 are combined.

The function classification of job No. 3 is printing. The number of originals is 10, and the number of copies is 2. Job No. 3 is executed by using the back end 540 of configuration No. 2 shown in FIG. 14.

The function classification of job No. 4 is printing. The number of originals is 3, and the number of copies is 2. Job No. 4 is executed by using the back end 560 of configuration No. 2.

The function classification of job No. 5 is a scanner. Job No. 5 is executed by using the front end 500 of configuration No. 2.

The function classification of job No. 6 is printing. The number of originals is 2, and the number of copies is 10. Job No. 6 is executed by using the back end 540 of configuration No. 2.

The function classification of job No. 7 is printing. The number of originals is 3, and the number of copies is 1. Job No. 7 is executed by using the back end 560 of configuration No. 2. By using these combinations for the individual jobs, the completion times of job Nos. 3 to 7 can be minimized.

When the user selects the number of a job displayed on the screen of the operation/display unit by clicking or the like, the selected execute job information is displayed. To select and execute job No. 3 first, the execute sequence may be changed such that job No. 3 and job Nos. 1 and 2 are switched.

In step S220 shown in FIG. 11A, the control unit 11 transmits a message in order to designate an operation sequence necessary to execute a job to each functional unit.

In step S222, the control unit 11 checks whether each functional unit sends a status to show that the functional unit is normal. If NO in step S222, the flow advances to steps S224 and S226 to transmit a message until the designated number of times of retry is exceeded, and the flow returns to step S220. If the functional unit does not send a status even after the designated number of times of retry is exceeded, the flow advances to step S26 in FIG. 7A.

If the control unit 11 determines in step S222 that each functional unit sends a status to show that the functional unit is normal, the flow advances to step S228.

In step S228, the control unit 11 subdivides the job and designates execution to a set synchronous point. The synchronous point is a point at which processes by a plurality of functional units must be synchronized. More specifically, when a leading functional unit advances its process to a certain stage while a plurality of functional units are executing subdivided jobs, the whole processing must be temporarily stopped until other succeeding functional units advance their processes to the same stage. This point is the synchronous point.

In step S230, whether each functional unit sends a status to the control unit 11 to show that the functional unit is normal is checked. If YES in step S230, the flow advances to step S240 shown in FIG. 11B. If NO in step S230, the flow advances to step S232.

In steps S232 and S236, a message is transmitted until the designated number of times of retry is exceeded, and the flow returns to step S228. If the functional unit does not send a status even after the designated number of times of retry is exceeded, the flow advances to step S234 to abnormally terminate the job and notifies the manager of this abnormal termination.

Figure 11B:
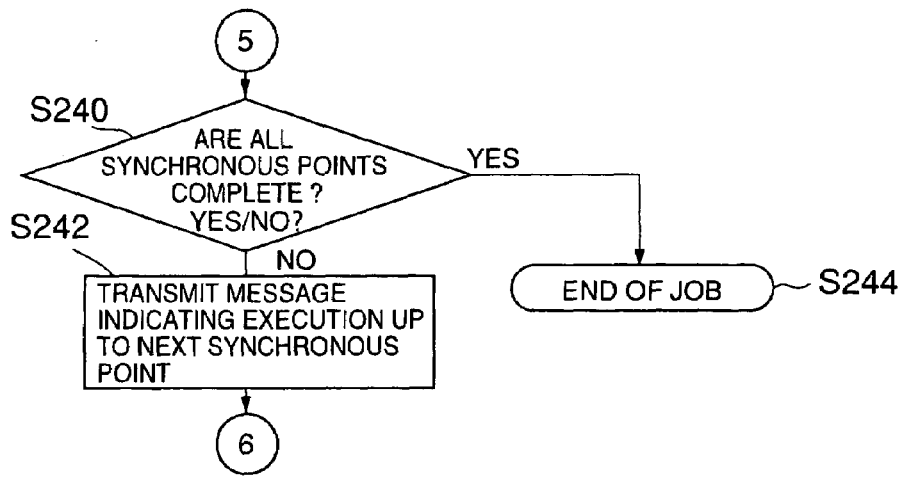

In the flowchart shown in FIG. 11B, in step S240, whether all the synchronous points contained in the job are complete is checked. If all the synchronous points are complete, the job ends in step S244. If not all the synchronous points are complete in step S240, the flow advances to step S242, and the control unit 11 transmits to each functional unit a message indicating execution to the next synchronous point. After that, the flow returns to step S230 in FIG. 11A.

If the job ends in step S244, the flow returns to step S66 shown in FIG. 7B.

Figure 11C:
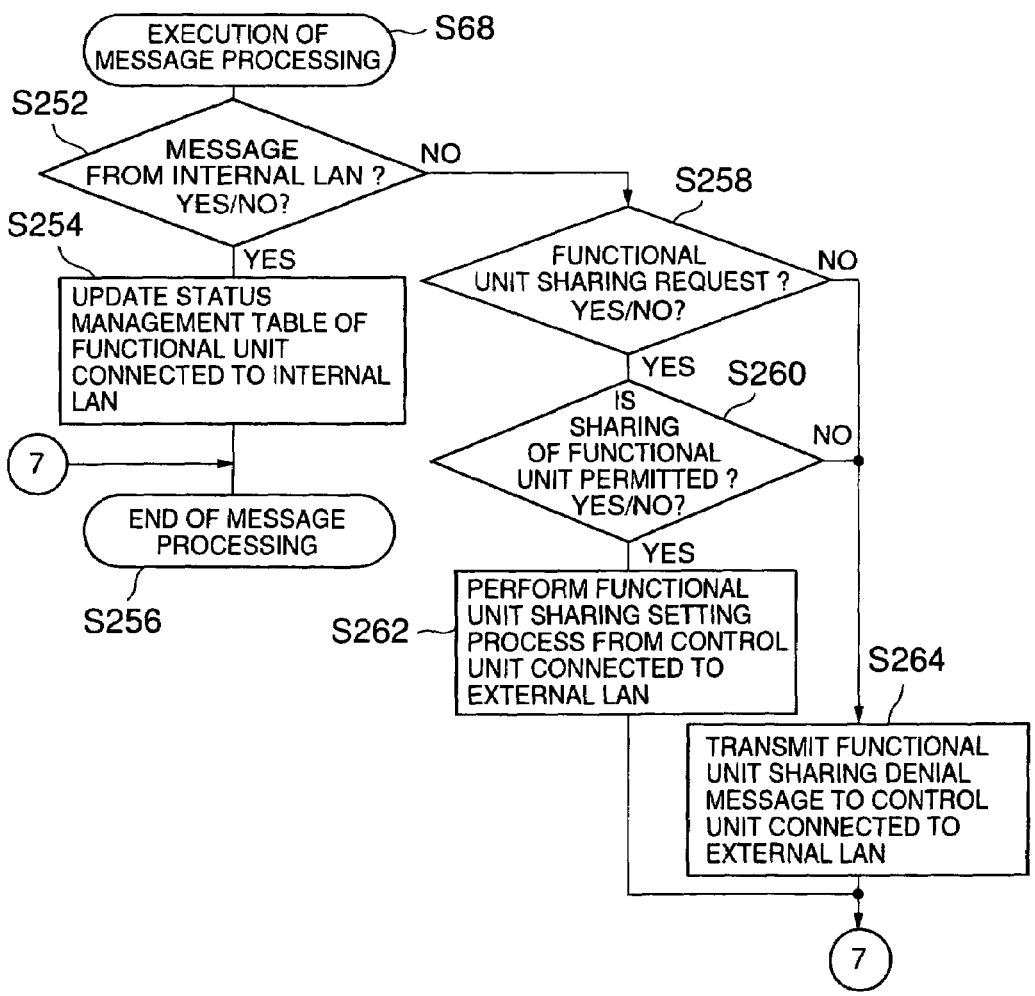

If the message processing is to be executed in step S68 of FIG. 7B, the flow advances to FIG. 11C. In step S252, whether the message is sent from a functional unit connected to the internal LAN is checked. If the message is sent from a functional unit connected to the internal LAN, the flow advances to step S254. If the message is not sent from a functional unit connected to the internal LAN, the flow advances to step S258.

In step S254, the status management table of the functional unit connected to the internal LAN is updated. In step S256, the message processing is complete.

If the message is not sent from a functional unit connected to the internal LAN, the flow advances to step S258 to check whether the message is a functional unit sharing request. If the message is a sharing request, the flow advances to step S260; if not, the flow advances to step S264.

In step S260, whether sharing of the corresponding functional unit is permitted is checked. If sharing is permitted, the flow advances to step S262; if not, the flow advances to step S264.

In step S262, a control unit connected to the external LAN performs setting for sharing this functional unit, and the flow returns to step S256 in FIG. 11C.

If the message is not a functional unit sharing request of if sharing of the functional unit is not permitted, the flow advances to step S264, and the control unit 11 transmits a message indicating denial of sharing of the functional unit to the control unit connected to the external LAN. Then, the flow returns to step S256 in FIG. 11C.

In the embodiment described above, if an MFP system currently being used includes a reusable unit whose life has not expired yet when the system is to be discarded, this unit can be reused as a constituent element of an MFP system to be newly purchased. That is, the user can freely configure the system.

Also, since the degree of freedom of combinations of functional units is high, MFP manufacturers can reduce the number of types of functional units to be developed.

When a large number of MFPs are used, labor can be saved by checking the stock of parts in a remote place and automatically ordering necessary parts.

Furthermore, it is possible to determine whether parts being used are recommended products. This makes it possible to eliminate poor products which may cause failures, and help improve the system operating ratio.

The above embodiment is merely an example and does not limit the present invention, so the present invention can be variously modified within the technical scope of the invention. For example, each functional unit in the above embodiment may also include another functional unit required to configure an MFP system.

What is claimed is:

1. A network MFP system, comprising:
    functional units each having a unique network address and connected to an internal network; and
    a control unit connected to said functional units across said internal network to control operations of said functional units,
    wherein said control unit implements a predetermined function by configuring an MFP system by dynamically combining said functional units for each job,
    wherein if a plurality of said functional units have equivalent functions and said plurality of functional units are simultaneously operable, said control unit adds said plurality of functional units to a configuration of said MFP system, and causes said plurality of functional units to execute assigned jobs, and, if said plurality of functional units are not simultaneously operable, said control unit adds one functional unit to the configuration of said MFP system, and uses the rest of said functional units as backup in the event of a failure.

2. A system according to claim 1, wherein
    said control unit is connected to an external network,
    said network MFP system further comprises:
    a second control unit connected to said external network; and
    another functional unit connected to said second control unit, and
    if said second control unit permits said control unit to share the other functional unit, said control unit adds said other functional unit to a configuration of said MFP system.

3. A system according to claim 2, wherein if a functional unit having a function equivalent to said control unit connected to said internal network is included in the other functional units connected to said external network, said control unit preferentially adds said functional unit connected to said internal network.

4. A system according to claim 2, wherein if the other functional unit connected to said external network is added to a configuration of said MFP system, said control unit checks whether the other functional unit satisfies predetermined performance, and, if determining that the other functional unit does not satisfy the predetermined performance, outputs a warning message to said operation/display unit.

5. A system according to claim 4, wherein if the information from said tag information reading unit is transmitted across said internal network, said control unit checks whether said expendable is a regular product, and, if it is determined that said expendable is not a regular product, outputs information indicating that said expendable is not a regular product.

6. A system according to claim 2, wherein when said control unit updates driver software and/or a parameter for operating said functional unit, if said second control unit having the driver software and/or the parameter whose life has not expired yet does not exist and/or if an unknown functional unit is connected to said internal network, said control unit acquires the driver software and/or the parameter from a download server connected to said external network.

7. A system according to claim 2, further comprising a tag information reading unit connected to said internal network or said external network,
wherein said tag information reading unit reads out tag information attached to an expendable to calculate a quantity in stock of said expandable, and, if the quantity in stock is smaller than a predetermined quantity, outputs information indicating that the quantity in stock is smaller than the predetermined quantity to said control unit.

8. A system according to claim 1, wherein
said functional unit transmits status information to said control unit for each predetermined time,
if, before said MFP system is configured, an error is received as the status information from said functional unit or no status information is received even after a predetermined time has elapsed, it is determined that said functional unit has failed, and said functional unit is deleted from an MFP system combinable configuration list, and
if, after said MFP system is configured, an error is received as the status information from said functional unit or no status information is received even after a predetermined time has elapsed, it is determined that said functional unit has failed, a reset command is supplied to said functional unit to reset said functional unit and check whether said functional unit normally operates, and, if an error is found, said MFP is reconfigured by using said functional units except for said functional unit having the error.

9. A system according to claim 1, further comprising a personal computer connected to said internal network,
wherein said control unit installs driver software having a predetermined function in said personal computer, thereby adding said personal computer to a configuration of said MFP system instead of said functional unit having the predetermined function.

10. A network MFP system, comprising:
functional units each having a unique network address and connected to an internal network; and
a control unit connected to said functional units across said internal network to control operations of said functional units,
wherein said control unit implements a predetermined function by configuring an MFP system by dynamically combining said functional units for each job, and
wherein said control unit configures said MFP system by combining said functional units such that a job completion time of each job is minimized.

11. system according to claim 10, wherein
said control unit is connected to an external network,
said network MFP system further comprises:
a second control unit connected to said external network; and
another functional unit connected to said second control unit, and
if said second control unit permits said control unit to share the other functional unit, said control unit adds said other functional unit to a configuration of said MFP system.

12. A system according to claim 11, wherein if a functional unit having a function equivalent to said control unit connected to said internal network is included in the other functional units connected to said external network, said control unit preferentially adds said functional unit connected to said internal network.

13. A system according to claim 11, wherein if the other functional unit connected to said external network is added to a configuration of said MFP system, said control unit checks whether the other functional unit satisfies predetermined performance, and, if determining that the other functional unit does not satisfy the predetermined performance, outputs a warning message to said operation/display unit.

14. A system according to claim 11, wherein when said control unit updates driver software and/or a parameter for operating said functional unit, if said second control unit having the driver software and/or the parameter whose life has not expired yet does not exist and/or if an unknown functional unit is connected to said internal network, said control unit acquires the driver software and/or the parameter from a download server connected to said external network.

15. A system according to claim 11, further comprising a tag information reading unit connected to said internal network or said external network,
wherein said tag information reading unit reads out tag information attached to an expendable to calculate a quantity in stock of said expandable, and, if the quantity in stock is smaller than a predetermined quantity, outputs information indicating that the quantity in stock is smaller than the predetermined quantity to said control unit.

16. A system according to claim 15, wherein if the information from said tag information reading unit is transmitted across said internal network, said control unit checks whether said expendable is a regular product, and, if it is determined that said expendable is not a regular product, outputs information indicating that said expendable is not a regular product.

17. A system according to claim 10, wherein
said functional unit transmits status information to said control unit for each predetermined time,
if, before said MFP system is configured, an error is received as the status information from said functional unit or no status information is received even after a predetermined time has elapsed, it is determined that said functional unit has failed, and said functional unit is deleted from an MFP system combinable configuration list, and if, after said MFP system is configured, an error is received as the status information from said functional unit or no status information is received even after a predetermined time has elapsed, it is determined that said functional unit has failed, a reset command is supplied to said functional unit to reset said functional unit and check whether said functional unit normally operates, and, if an error is found, said MFP is reconfigured by using said functional units except for said functional unit having the error.

18. A system according to claim 10, further comprising a personal computer connected to said internal network, wherein said control unit installs driver software having a predetermined function in said personal computer, thereby adding said personal computer to a configuration of said MFP system instead of said functional unit having the predetermined function.

19. A network MFP system, comprising:

functional units each having a unique network address and connected to an internal network; and a control unit connected to said functional units across said internal network to control operations of said functional units, wherein said control unit implements a predetermined function by configuring an MFP system by dynamically combining said functional units for each job, said control unit is connected to an external network, said network MFP system further comprises:

a second control unit connected to said external network; and another functional unit connected to said second control unit, and if said second control unit permits said control unit to share the other functional unit, said control unit adds said other functional unit to a configuration of said MFP system, and said control unit assigns selectively each job to be executed by a front end or a back end based on content of each job.

20. A system according to claim 19, wherein the content of each job includes information regarding a function classification, a number of originals to be processed, and a number of copies.

* * * * *